(12) United States Patent
Kim

(10) Patent No.: US 12,609,374 B2
(45) Date of Patent: Apr. 21, 2026

(54) COOLING PIPE OF ELECTRIC VEHICLE BATTERY

(71) Applicant: J&S Co., Ltd., Chilgok-gun (KR)

(72) Inventor: Byeongsu Kim, Daegu (KR)

(73) Assignee: J&S Co., Ltd., Chilgok-gun (KR)

( * ) Notice: Subject to any disclaimer, the term of this patent is extended or adjusted under 35 U.S.C. 154(b) by 114 days.

(21) Appl. No.: 18/037,046

(22) PCT Filed: May 3, 2023

(86) PCT No.: PCT/KR2023/006060
§ 371 (c)(1),
(2) Date: May 15, 2023

(87) PCT Pub. No.: WO2024/210254
PCT Pub. Date: Oct. 10, 2024

(65) Prior Publication Data
US 2025/0079562 A1　　Mar. 6, 2025

(30) Foreign Application Priority Data

Apr. 4, 2023　　(KR) ........................ 10-2023-0044051

(51) Int. Cl.
*H01M 10/6556*　　(2014.01)
*H01M 10/613*　　(2014.01)
(Continued)

(52) U.S. Cl.
CPC ..... *H01M 10/6556* (2015.04); *H01M 10/613* (2015.04); *H01M 10/625* (2015.04); *H01M 10/66* (2015.04); *H01M 2220/20* (2013.01)

(58) Field of Classification Search
CPC ........... H01M 10/6556; H01M 10/613; H01M 10/625; H01M 10/66; H01M 2220/20
(Continued)

(56) References Cited

U.S. PATENT DOCUMENTS 2,913,011 A * 11/1959 Noyes ..................... A47L 9/248
D23/266
6,216,771 B1 * 4/2001 Holmberg ............... F28D 15/00
257/E23.098
(Continued)

FOREIGN PATENT DOCUMENTS

CN 106257741 A * 12/2016 ......... B60R 13/0846
CN 107069142 A * 8/2017 ......... H01M 10/613
(Continued)

OTHER PUBLICATIONS

Korean Office Action issued on Jun. 1, 2023, in counterpart Korean Patent Application No. 10-2023-0044051 (1 page in English, 2 pages in Korean).
(Continued)

*Primary Examiner* — Len Tran
*Assistant Examiner* — Gustavo A Hincapie Serna
(74) *Attorney, Agent, or Firm* — NSIP Law

(57) ABSTRACT

The present disclosure relates to a cooling pipe of an electric vehicle battery that is coupled to one side and the other side of a radiator, passes between battery modules of which a battery pack consists, and cools the battery modules, including: a body pipe that is formed in a pipe shape so that a flow path through which a cooling fluid flows is formed therein and has an inlet on one side and an outlet on the other side, wherein the inlet is coupled to one side of the radiator and the outlet is coupled to the other side thereof; and a corrugated pipe that is integrally formed with the body pipe and is formed in the form of one or more corrugations between the inlet and the outlet.

5 Claims, 5 Drawing Sheets

(51) Int. Cl.
_H01M 10/625_ (2014.01)
_H01M 10/66_ (2014.01)

(58) Field of Classification Search
USPC ........................................................ 165/177
See application file for complete search history.

(56) References Cited

U.S. PATENT DOCUMENTS

| | | | | |
|---|---|---|---|---|
| 6,354,332 | B1 * | 3/2002 | Burkhardt .............. | F16L 27/111 |
| | | | | 138/131 |
| 8,919,173 | B2 * | 12/2014 | Hibino ................... | F16L 11/112 |
| | | | | 72/370.19 |
| 9,452,686 | B2 * | 9/2016 | Yang ................... | H01M 10/617 |
| 10,629,860 | B2 | 4/2020 | Schröder et al. | |
| 10,720,678 | B2 * | 7/2020 | Kim .................... | H01M 10/613 |
| 2004/0118470 | A1 * | 6/2004 | Furuta ..................... | F16L 33/26 |
| | | | | 138/143 |
| 2008/0299446 | A1 * | 12/2008 | Kelly ................ | H01M 10/6568 |
| | | | | 429/88 |
| 2009/0142653 | A1 * | 6/2009 | Okada ................. | H01M 50/209 |
| | | | | 429/120 |
| 2010/0155040 | A1 | 6/2010 | Hoffmann et al. | |
| 2010/0257883 | A1 * | 10/2010 | Damsohn ............ | H01M 10/625 |
| | | | | 429/120 |
| 2011/0316271 | A1 * | 12/2011 | Lalam ..................... | F16L 13/02 |
| | | | | 285/179 |
| 2012/0237805 | A1 * | 9/2012 | Abels ................ | H01M 10/6567 |
| | | | | 228/136 |
| 2013/0011713 | A1 * | 1/2013 | Harada ................... | F28F 13/08 |
| | | | | 429/120 |
| 2013/0071720 | A1 * | 3/2013 | Zahn ................... | H01M 50/211 |
| | | | | 29/890.039 |
| 2020/0006826 | A1 * | 1/2020 | Einoegg ............ | H01M 10/6567 |
| 2020/0361289 | A1 * | 11/2020 | Yamagishi .......... | H01M 10/625 |
| 2021/0122263 | A1 | 4/2021 | Dziubinschi et al. | |
| 2021/0399357 | A1 * | 12/2021 | Choi ................... | H01M 10/643 |
| 2022/0316635 | A1 * | 10/2022 | Song ..................... | F16L 51/027 |
| 2024/0145817 | A1 * | 5/2024 | Beck ................. | H01M 10/6567 |
| 2024/0297370 | A1 * | 9/2024 | Chen ................... | H01M 50/262 |
| 2024/0313328 | A1 * | 9/2024 | Shin .................... | H01M 10/647 |

FOREIGN PATENT DOCUMENTS

| | | | | | | |
|---|---|---|---|---|---|---|
| CN | 208028103 | U | * | 10/2018 | .......... | H01M 10/613 |
| CN | 110277603 | A | * | 9/2019 | .......... | H01M 10/613 |
| DE | 102017216785 | A1 | * | 3/2019 | .......... | H01M 50/227 |
| EP | 1990862 | A1 | * | 11/2008 | ............. | H01M 6/46 |
| JP | 2013-16351 | A | | 1/2013 | | |
| JP | 2020-43037 | A | | 3/2020 | | |
| JP | 2022-75353 | A | | 5/2022 | | |
| KR | 10-2009-0059434 | A | | 6/2009 | | |
| KR | 10-1446956 | B1 | | 11/2014 | | |
| KR | 10-2019-0140645 | A | | 12/2019 | | |
| KR | 102176097 | B1 | * | 11/2020 | ........... | H01M 50/20 |
| KR | 10-2269221 | B1 | | 6/2021 | | |
| KR | 10-2021-0133459 | A | | 11/2021 | | |
| KR | 10-2022-0060318 | A | | 5/2022 | | |

OTHER PUBLICATIONS

International search report issued on Nov. 2, 2023, in counterpart International Patent Application No. PCT/KR2023/006060 (4 pages in English, 3 pages in Korean).

Opinion of International Searching Authority issued on Dec. 22, 2023, in counterpart International Patent Application No. PCT/KR2023/006060 (3 pages in English, 3 pages in Korean).

Canadian Office Action Issued on Nov. 29, 2024, in Counterpart Canadian Patent Application No. 3,204,863 (5 Pages in English).

Extended European Search Report Issued on Apr. 8, 2025, in Counterpart European Patent Application No. 23733190.5 (8 Pages in English).

Japanese Office Action Issued on Jul. 22, 2025, in Counterpart Japanese Patent Application No. 2023-528381 (5 Pages in English, 5 Pages in Japanese).

European Office Action Issued on Oct. 6, 2025, in Counterpart European Patent Application No. 23 733 190.5 (5 Pages in English).

Japanese Notice of Allowance issued on Jan. 6, 2026, in counterpart Japanese Patent Application No. 2023-528381 (4 pages in English, 4 pages in Japanese).

* cited by examiner

[FIG. 1]
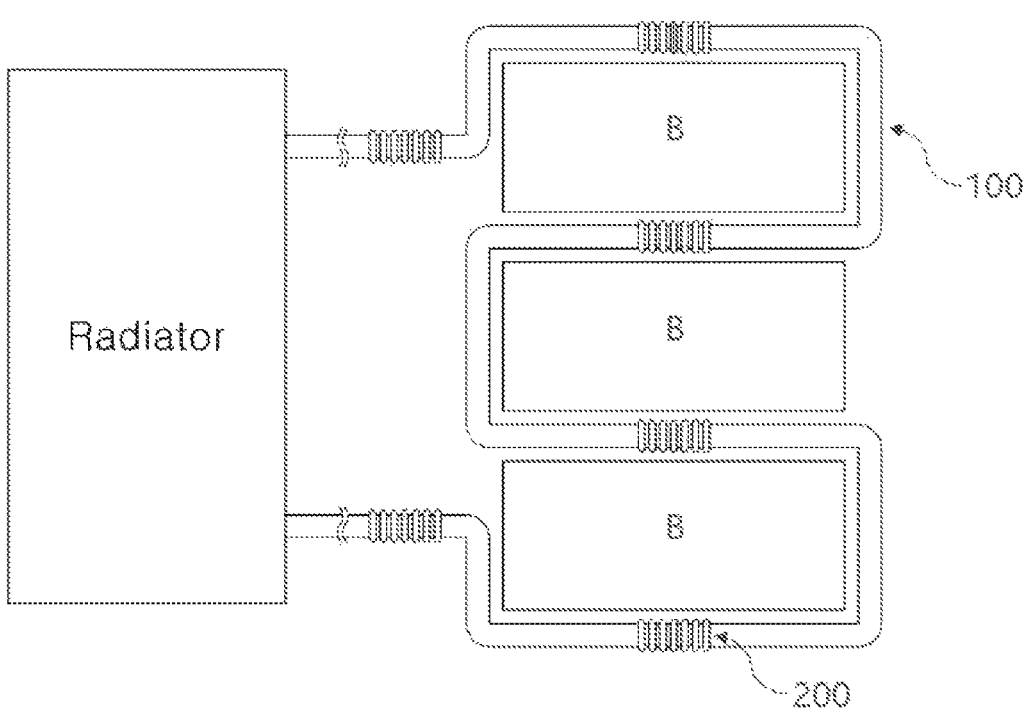

[FIG. 2]
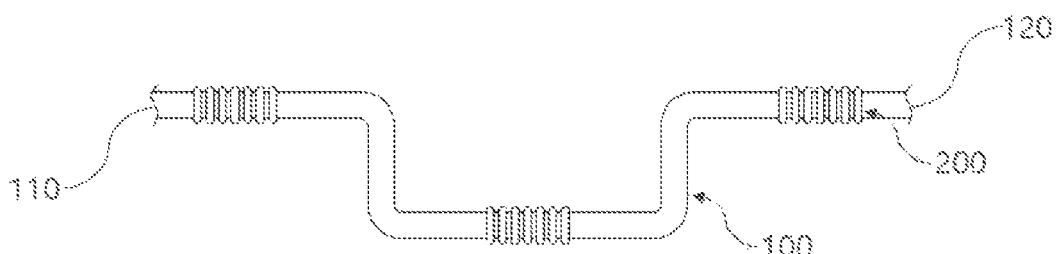

[FIG. 3]
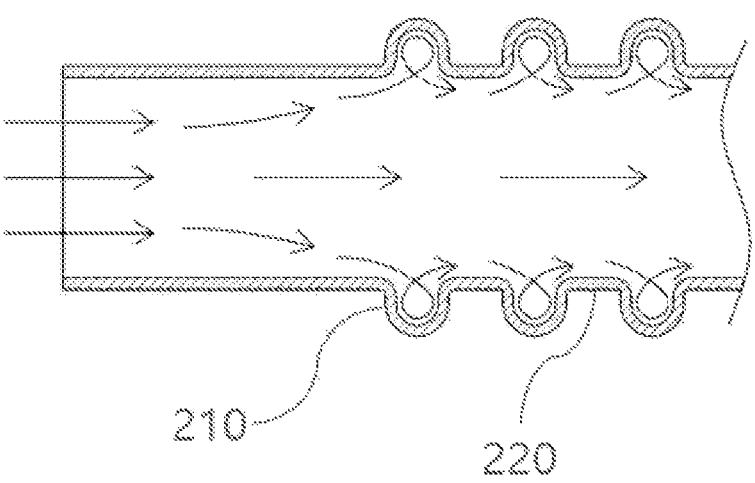
210
220

[FIG. 4]
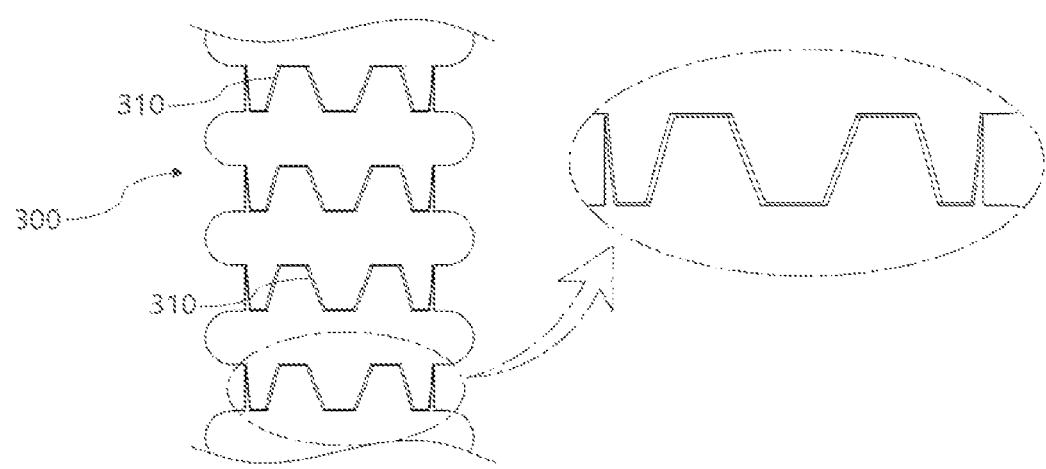

[FIG. 5]
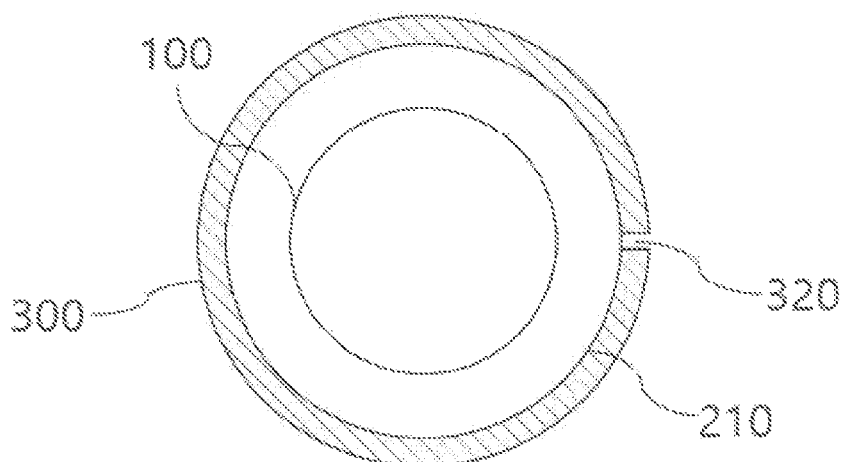

COOLING PIPE OF ELECTRIC VEHICLE BATTERY

CROSS REFERENCE TO RELATED APPLICATIONS

This application is a U.S. National Stage Application of International Application No. PCT/KR2023/006060, filed on May 3, 2023, which claims the benefit under 35 USC 119(a) and 365(b) of Korean Patent Application No. 10-2023-0044051, filed on Apr. 4, 2023, in the Korean Intellectual Property Office, the entire disclosure of which is incorporated herein by reference for all purposes.

BACKGROUND

Field

The present disclosure relates to a cooling pipe of an electric vehicle battery, and, more particularly, to a cooling pipe of an electric vehicle battery that has a corrugated pipe generating vortexes and thus is more excellent in cooling the electric vehicle battery.

Related Art

Recently, due to the popularization of electric or hybrid vehicles, the importance of batteries has been increasingly highlighted.

Not only is interest in battery capacity growing, but interest in the factors that affect battery efficiency, lifespan, etc. is also growing.

High-voltage, high-capacity batteries for electric or hybrid vehicles generally consist of a plurality of battery modules that are each made of a plurality of battery cells, and a battery pack consists of the plurality of battery modules.

The plurality of battery modules are installed together in a narrow space, generating high-temperature heat, which may act as a factor adversely affecting the lifespan of the battery as a whole.

Therefore, a cooling system for controlling high-temperature heat generated by a high-voltage, high-capacity battery must be built in an electric or hybrid vehicle.

In general, the methods of cooling the high-voltage, high-capacity batteries are classified into air-cooling and water-cooling, and each can be further classified into an indirect cooling method and a direct cooling method.

The indirect air-cooling or water-cooling, which is mainly used in the conventional technology, is a method in which a separate heat sink is brought into contact with the surface of a battery module to conduct heat and the battery module is cooled by a heat sink fin placed on one side of the heat sink for heat exchange.

In addition, the direct air-cooling or water-cooling for the conventional technology is a method of cooling a battery module by directly sending air to the surface of the battery module.

However, in the case of the conventional indirect methods, since a heat sink fin needs to be applied between battery modules, the volume of batteries for electric or hybrid vehicles increases and the number of parts increases, resulting in a cost rise, and, in the case of the conventional direct methods, the overall volume of the batteries increases because a passage gap for cooling needs to be secured between battery modules.

SUMMARY

To resolve the aforementioned problems, the present disclosure provides a cooling pipe of an electric vehicle battery in which a corrugated pipe may be formed on the cooling pipe to generate vortexes of a cooling fluid flowing from a radiator to the cooling pipe and the velocity of the cooling fluid may be reduced due to the shape of the corrugated pipe so as to improve the capability of cooling a battery module.

The problems to be solved by the present disclosure are not limited to the above-mentioned problems, and other problems not mentioned above will be clearly understood by a person having ordinary skills in the art from the description below.

To solve the above-mentioned problems, the present disclosure provides a cooling pipe of an electric vehicle battery that may be coupled to one side and the other side of a radiator, pass between battery modules of which a battery pack consists, and cool the battery modules, including: a body pipe that may be formed in a pipe shape so that a flow path through which a cooling fluid flows may be formed therein and have an inlet on one side and an outlet on the other side, in which the inlet may be coupled to one side of the radiator and the outlet may be coupled to the other side thereof; and a corrugated pipe that may be integrally formed with the body pipe and formed in the form of one or more corrugations between the inlet and the outlet.

The corrugated pipe may include: a plurality of expansion tubes whose circumference may be wider than the circumference of the body pipe; and one or more spacers that may be arranged between the plurality of expansion tubes to form a gap therebetween and formed to have a circumference smaller than or equal to the circumference of the body pipe, and the plurality of expansion tubes and the one or more spacers may be alternately arranged with their constant widths in a longitudinal direction of the body pipe.

As a cooling fluid flowing into the inlet through the radiator may collide with the inner diameter of the plurality of expansion tubes and move along the inner diameter thereof, vortexes may be generated in the corrugated pipe so as to slow down the cooling fluid.

Since the cross-sectional area of the plurality of expansion tubes may be wider than that of the body pipe, the velocity at which a cooling fluid flows in the plurality of expansion tubes may be lower than the velocity at which a cooling fluid flows in the body pipe.

The cooling pipe may be made of aluminum.

As such, the present disclosure provides a cooling pipe of an electric vehicle battery in which a corrugated pipe may be formed on the cooling pipe to generate vortexes of a cooling fluid flowing from a radiator to the cooling pipe and the velocity of the cooling fluid may be reduced due to the shape of the corrugated pipe so as to improve the capability of cooling a battery module.

The effects of the present disclosure are not limited to the above-mentioned effects, and other effects not mentioned above will be clearly understood by a person having ordinary skills in the art from the description below.

BRIEF DESCRIPTION OF THE DRAWINGS

FIG. 1 is a view illustrating a cooling pipe of an electric vehicle battery according to an embodiment of the present disclosure.

FIG. 2 is a view showing how a corrugated pipe is formed on a body pipe of the cooling pipe of an electric vehicle battery according to an embodiment of the present disclosure.

FIG. 3 is a view showing how vortexes are generated by the corrugated pipe of the cooling pipe of an electric vehicle battery according to an embodiment of the present disclosure.

FIG. 4 is a view showing an expansion preventing part tightly coupled to a cooling pipe of an electric vehicle battery according to another embodiment of the present disclosure.

FIG. 5 is a view showing the expansion preventing part of the cooling pipe of an electric vehicle battery according to another embodiment of the present disclosure.

DESCRIPTION OF EXEMPLARY EMBODIMENTS

Since various changes may be made to the present disclosure, resulting in a range of embodiments of the present disclosure, specific embodiments are illustrated in the drawings to be described in detail.

However, this is not intended to limit the present disclosure to specific embodiments, and it should be understood that all changes, equivalents, and substitutes included in the technology and scope of the present disclosure are included in the present disclosure. Similar reference numerals are used for similar components in the description of each figure.

When a component is referred to as "connected" to another component, it should be understood that it may be directly connected to the other component or there may be other components therebetween. On the other hand, when a component is referred to as "directly connected" to another component, it should be understood that no other component exists therebetween.

Terms used in the present disclosure are only used to describe specific embodiments, and are not intended to limit the present disclosure. Expressions in the singular form include the meaning of the plural form unless they clearly mean otherwise in the context. In the present disclosure, expressions such as "include" or "have" are only for indicating the existence of a feature, number, step, operation, component, part, or combination thereof described in the present disclosure, and are not intended to exclude in advance the existence or the possibility of the addition of one or more other features, numbers, steps, operations, components, parts, or combinations thereof.

Hereinafter, the embodiments of the present disclosure will be described with reference to the accompanying drawings. The same reference numbers in each figure indicate the same components. In the description of the present disclosure, detailed descriptions of functions or features well-known in the art will not be provided not to obscure the gist of the present disclosure.

FIG. 1 is a view showing a cooling pipe of an electric vehicle battery according to an embodiment of the present disclosure, FIG. 2 is a view showing how a corrugated pipe is formed on a body pipe of the cooling pipe of an electric vehicle battery according to an embodiment of the present disclosure, and FIG. 3 is a view showing how vortexes are generated by the corrugated pipe of the cooling pipe of an electric vehicle battery according to an embodiment of the present disclosure.

Referring to FIGS. 1 to 3, the body pipe 100 and corrugated pipe 200 may be included in the cooling pipe of an electric vehicle battery that may be coupled to one side and the other side of a radiator, pass between battery modules B of which a battery pack consists, and cool the battery modules B.

The body pipe 100 may be formed in a pipe shape so that a flow path through which a cooling fluid flows may be formed therein. An inlet 110 may be formed on one side of the body pipe 100, and an outlet 120 may be formed on the other side thereof.

Here, the inlet 110 may be coupled to one side of the radiator, and the outlet 120 may be coupled to the other side of the radiator.

In addition, the body pipe 100 may be formed in various shapes such as a straight line, a bend, and a curve.

Meantime, the radiator may be a device for dissipating heat generated in the battery module and absorbed in cooling water. Since this is a well-known technology, a detailed description thereof will not be provided.

The corrugated pipe 200 may be integrally formed with the body pipe 100, and may be formed in the form of one or more corrugations between the inlet 110 and the outlet 120.

In addition, the corrugated pipe 200 may include a plurality of expansion tubes 210 and one or more spacers 220.

The circumference of the plurality of expansion tubes 210 may be larger than the circumference of the body pipe 100. Furthermore, the one or more spacers 220 may be arranged between the plurality of expansion tubes 210 to form a gap therebetween, and may be formed to have a circumference less than or equal to the circumference of the body pipe 100.

That is, the one or more spacers 220 may have a circumference of the same size as the circumference of the body pipe 100 as shown in FIG. 3. However, this is only an example, and the one or more spacers 220 may have a smaller circumference than the circumference of the body pipe 100.

In addition, the plurality of expansion tubes 210 and the one or more spacers 220 may be alternately arranged with their constant widths in a longitudinal direction of the body pipe 100.

With reference to FIG. 3, as a cooling fluid flowing into the inlet 110 through the radiator may collide with the inner diameter of the plurality of expansion tubes 210 and move along the inner diameter thereof, vortexes may be generated in the corrugated pipe 200 so as to slow down the cooling fluid.

To describe in detail the process in which vortexes are generated, a cooling fluid flowing into the inlet 110 may move in the longitudinal direction of the body pipe 100 to the expansion tube 210, which extends beyond the circumference of the body pipe 100, and collide with the inner diameter of the expansion tube 210, so that the moving direction of the cooling fluid may be changed, resulting in the formation of the vortexes.

Moreover, the cooling fluid flowing into the inlet 110 may flow at the constant velocity, but the velocity may decrease as the cross-sectional area (the area in which water flows) of the expansion tube 210 expands.

In other words, since the cross-sectional area of the plurality of expansion tubes 210 may be wider than that of the body pipe 100, the velocity at which the cooling fluid flows in the plurality of expansion tubes 210 may be lower than the velocity at which the cooling fluid flows in the body pipe 100.

In addition, when the body pipe 100 corresponds to a straight section corresponding to the straight length of the battery module B, the one or more corrugated pipes 200 may be formed with a predetermined distance therebetween.

Meanwhile, the cooling pipe of an electric vehicle battery may be made of aluminum. The thermal conductivity is increased when the cooling pipe is made of aluminum; aluminum is cheaper than stainless steel: it is light and thus can be easily moved: and it is easy to process so that the cooling pipe can be made in a variety of designs.

FIG. 4 is a view showing an expansion preventing part tightly coupled to a cooling pipe of an electric vehicle battery according to another embodiment of the present disclosure, and FIG. 5 is a view showing the expansion preventing part of the cooling pipe of an electric vehicle battery according to another embodiment of the present disclosure.

Referring to FIGS. 4 and 5, compared to the cooling pipe of an electric vehicle battery according to one embodiment of the present disclosure, the cooling pipe of an electric vehicle battery according to another embodiment of the present disclosure may further include the expansion preventing part 300 tightly coupled to a corrugated pipe 200 and may include other components in the same manner.

Therefore, the same descriptions will not be repeated.

Specifically, in the case of the cooling pipe of an electric vehicle battery according to another embodiment of the present disclosure, to prevent problems of the damage caused by expansion of the volume of a cooling fluid due to heat (temperature), etc., the expansion preventing part 300 may be tightly coupled to the corrugated pipe 200.

The expansion preventing part 300 may be made of rubber and may prevent the expansion of the corrugated pipe 200 by physically applying pressure to the corrugated pipe 200.

In addition, the expansion preventing part 300 may prevent the dispersion of debris, etc. generated during the expansion of the corrugated pipe 200 that is damaged or not able to function properly.

Furthermore, one or more cross protrusions 310 may be formed on the expansion preventing part 300 to be alternately arranged in a vertical direction in order to maintain and protect the distance between a plurality of expansion tubes 210 and the one or more spacers 220 when the corrugated pipe 200 is inflated.

That is, referring to FIGS. 4 and 5, the one or more cross protrusions 310 may be formed in a downward direction on any one of the plurality of expansion tubes 210, and the one or more cross protrusions 310 may be formed in an upward direction on another one of the plurality of expansion tubes 210.

Here, the upward and downward directions were based on FIG. 4, and the one or more cross protrusions 310 may be formed in left and right directions based on the positions of the corrugated pipe 200 and the expansion preventing part 300 in an actual product.

In addition, when the one or more cross protrusions 310 are formed in the upward or downward direction, the vertexes thereof may be formed in a straight line so as to correspond to the upper and lower surfaces of the expansion tube 210, respectively.

Furthermore, referring to FIGS. 4 and 5, a predetermined incision groove 320 may be formed vertically at the expansion preventing part 300. As the corrugated pipe 200 may be widened by an external force (e.g., force applied by a user) along the incision groove 320, the expansion preventing part 300 may be fitted and coupled to the corrugated pipe 200.

The optimal embodiments of the present disclosure have been disclosed in the drawings and description. Although the specific terms have been used herein, they have been only used to describe the present disclosure and have not been used to limit the meaning or scope of the present disclosure described in the claims. Therefore, a person having ordinary skills in the art will understand that various modifications and equivalent other embodiments are possible therefrom. Thus, the true technical scope of the present disclosure should be determined based on the technology in the appended claims.

What is claimed is:

1. A cooling pipe of an electric vehicle battery that is coupled to a first side and a second side of a radiator, passes between each of a plurality of battery module in a battery pack, and cools the plurality of battery modules, comprising:

a body pipe of a pipe shape so that a flow path, through which a cooling fluid flows, is formed therein and comprising an inlet on a first end of the body pipe and an outlet on a second end of the body pipe, wherein the inlet is coupled to the first side of the radiator and the outlet is coupled to the second side of the radiator;

a corrugated pipe that is integrally formed with the body pipe and comprises a plurality of corrugations between the inlet and the outlet;

an expansion stopper made of rubber disposed along a circumference of the body pipe and tightly coupled to a surface of the corrugated pipe;

wherein the corrugated pipe comprises:

a plurality of expansion tubes whose circumference is wider than the circumference of the body pipe; and a plurality of spacers that are arranged between each of the plurality of expansion tubes to form a gap therebetween and are formed to have a circumference smaller than or equal to the circumference of the body pipe, wherein the plurality of expansion tubes and the plurality of spacers are alternately disposed along the flow path, wherein the expansion stopper comprises an incision groove such that the expansion stopper is widened by applying physical force when the expansion stopper is coupled to the surface of the corrugated pipe, and wherein the expansion stopper comprises:

a plurality of first portions comprising first cross protrusions alternately arranged between the expansion tubes and the spacers; and a plurality of second portions comprising second cross protrusions alternately arranged between the expansion tubes and the spacers, and wherein the plurality of first portions and the plurality of second portions are connected to each other.

2. The cooling pipe of an electric vehicle battery of claim 1, wherein, as the cooling fluid flowing into the inlet through the radiator collides with inner surfaces of the plurality of expansion tubes and moves along the flow path, vortexes are generated in the corrugated pipe so as to slow down the cooling fluid.

3. The cooling pipe of an electric vehicle battery of claim 1, wherein a velocity, at which the cooling fluid flows in the plurality of expansion tubes, is lower than a velocity, at which the cooling fluid flows in the body pipe.

4. The cooling pipe of an electric vehicle battery of claim 1, wherein the cooling pipe is made of aluminum.

5. The cooling pipe of an electric vehicle battery of claim 1, wherein the expansion stopper is disposed on each of the plurality of corrugations.

* * * * *